MAGNETIC STORAGE ARRANGEMENTS

Filed March 26, 1968 3 Sheets-Sheet 1

Inventors
GEOFFREY G. PULLUM
WILLIAM R. KNOWLES
By
Attorney

Inventors
GEOFFREY G. PULLUM
WILLIAM R. KNOWLES
By Charles T. Johnson
Attorney

Inventors
GEOFFREY G. PULLUM
WILLIAM R. KNOWLES
By Charles L. Johnson Jr.
Attorney

United States Patent Office 3,546,683
Patented Dec. 8, 1970

3,546,683

MAGNETIC STORAGE ARRANGEMENTS

Geoffrey George Pullum, Sawbridgeworth, and William Ralph Knowles, Harlow, England, assignors to Standard Telephones and Cables Limited, London, England, a company of Great Britain Filed Mar. 26, 1968, Ser. No. 716,194
Claims priority, application Great Britain, Apr. 7, 1967, 15,991/67
Int. Cl. G11c *11/08, 5/02*
U.S. Cl. 340—174 3 Claims

ABSTRACT OF THE DISCLOSURE

This is a variation of the waffle iron type magnetic storage, this invention using two cores per bit, and the actual arrangement is such that the information is stored by producing different magnetic states in each of the two cells associated with the stored bit.

This invention relates to magnetic storage arrangements having nondestructive read-out properties, such as two-dimensional digital storage arrays used in computers and other data processing equipments.

The term "non-destructive read-out" indicates storage arrangements in which stored information is retained, i.e. it is not destroyed, when the store is read or interrogated. The stored information is in fact retained until such time as a deliberate clearing operation is performed, usually immediately prior to the insertion of fresh information in the store. This is in contrast to "destructive read-out" in which reading automatically destroys the information which has immediately to be re-written into the store if it is to be retained.

According to the invention there is provided a magnetic storage arrangement in which a bit of digital information can be stored in a nondestructive read-out manner, the arrangement including a planar thin-film of isotropic magnetic material a pair of magnetically isolated storage locations, each storage location being part of a magnetic circuit completed by magnetic material having a low reluctance and high electrical resistivity, a first electrical conductor associated with both storage locations in turn, a second electrical conductor associated with one of the storage locations in a manner similar to the first conductor, a third electrical conductor associated with the other storage location in a manner similar to the first conductor, means for energizing the first conductor alone whereby all the storage locations associated therewith are set to a first condition of magnetisation, means for energizing the first and second only or the first and third conductors only whereby the combined currents flowing in either pair of conductors so energised is sufficient to switch only either the first or second storage location to a second condition of magnetisation, the current flowing in either conductor of an energised pair being insufficient of itself to switch a storage location to the second condition of magnetisation, and means for energising the first conductor whereby the current flowing therein is sufficient to switch partially one of the pair of storage locations associated therewith from one condition toward the other condition, the storage locations returning to and remaining in the original condition at the cessation of any such energisation of the first conductor.

Figure 1:
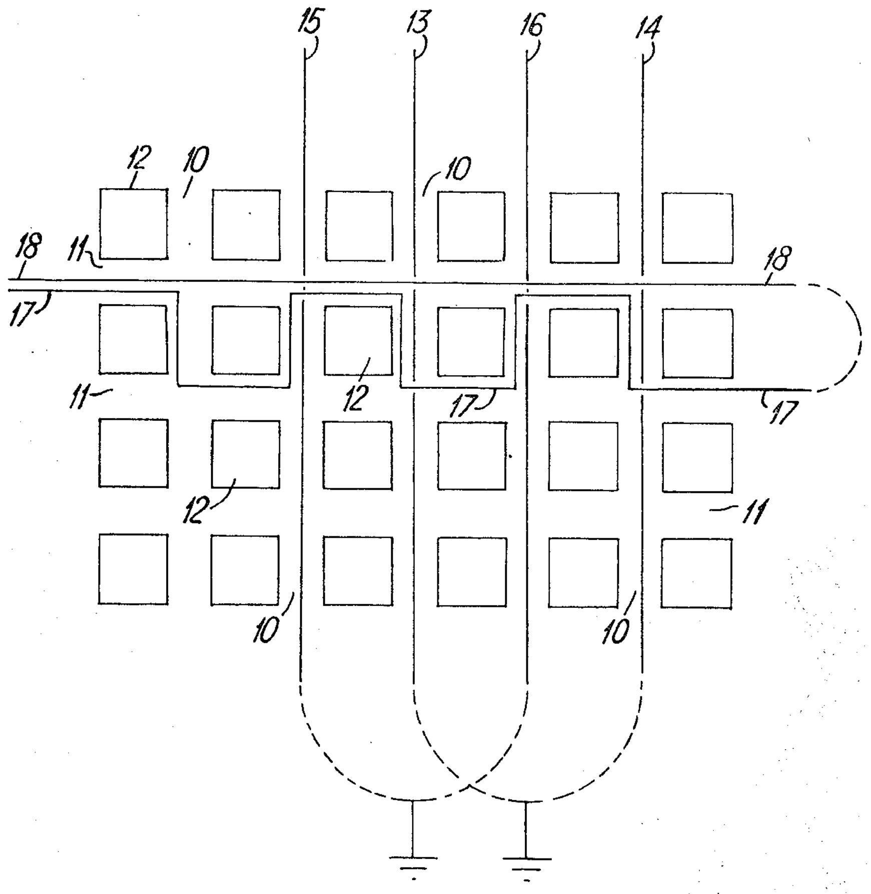
Figure 2:
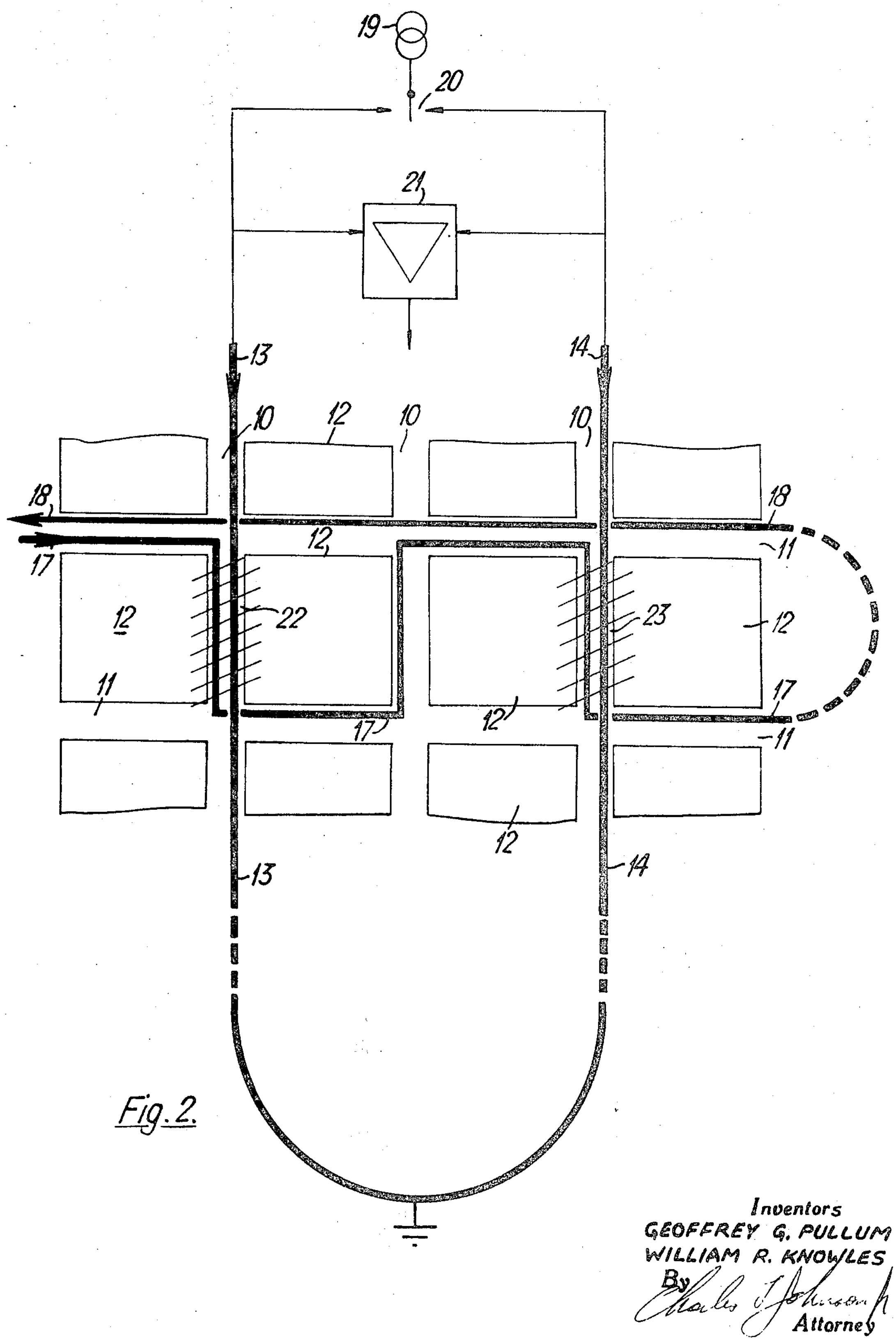

In order that the invention may be more readily understood an embodiment thereof will be described with reference to the accompanying drawings, in which FIG. 1 is a diagrammatic plan view of the wiring arrangements for part of a storage matrix;

FIG. 2 is a detail enlargement of part of FIG. 1 illustrating the arrangement for storing one bit of digital information, and FIGS. 3*a*–3*d* illustrate the waveforms used in the arrangement of FIG. 2.

The construction of the storage matrix illustrated in FIG. 1 is as follows: A flat slice of ferrite material has a first series of narrow, parallel slots 10 cut in one face, referred to hereinafter as "column" slots, and a second series of parallel slots 11 cut in the same face, referred to as "row" slots. The column and row slots together create a two-dimensional pattern of square raised posts 12, also disposed in columns and rows. Pairs of insulated wires 13, 14 and 15, 16 are placed in individual column slots 10, and are referred to as "digit" wires. A third wire 17, known as a "word" wire, is placed in alternate segments of two adjacent row slots 11, the shift from one segment of one row slot to the succeeding segment of the adjacent row slot being by way of the interconnecting segment of a column slot 10. The result is to provide what may be termed a zig-zag winding, as shown in FIG. 1. It will be observed that each of the pair of digit wires 13, 14 shares a segment of its column slot 10 between the same two slots 11 with the word wire 17, but that these two segments are not in adjacent slots 10 but are separated by at least one intermediate slot 10, which carries the digit wire 16. Similarly the two digit wires 15, 16 are separated by the slot carrying wire 13. The reason for this interleaving of pairs of wires is to keep the noise induced a digit wire during the read operation as low as possible. If the winding is as shown in the figure, an induced pulse in wire 13, caused by a read pulse in wire 17, will oppose the corresponding induced pulse in wire 14. Each pair of digit wires 13, 14 is associated with one bit of information, the arrangement generally being referred to as "two cores per bit" storage, as will be explained more fully later.

The arrangement of FIG. 1 is completed by providing a return wire 18 for the word wire 17, the wire 18 being laid in one of the slots 11 in which the wire 17 is partially laid. For the sake of clarity FIG. 1 omits the pulse generators and logic associated with the matrix though they are referred to in connection with FIG. 2.

Reference was made to the magnetic circuits of FIG. 1. These are constituted partly by the ferrite material in the base of each slot and the posts 12 extending upwards on each side of the slots carrying the wires, and partly by a planar thin film of isotropic magnetic material having a substantially square hysteresis loop, the film being laid across the top of the ferrite slice, i.e. covering the slotted face of the ferrite. A suitable material is film of nickel-iron. Whilst the magnetic circuits consists of both ferrite and isotropic magnetic material, the actual storage takes place in the thin film alone.

The term "thin film" in this context refers to a film of material approximately 1$\mu$ thick. The term "thin" is relative only, and in other contexts a film 1$\mu$ thick may be regarded as a "thick" film.

Turning now to FIG. 2, the arrangement of wires and slots necessary for storing one bit of digital information is shown in detail. The same reference numerals as in FIG. 1 are used where applicable. FIG. 2 therefore shows three column slots 10, two row slots 11, and wires 13, 14, 17 and 18, together with certain of the associated drive and logic circuitry. The latter is depicted pictorially and shows a current generator 19 with a two-way switch 20, forming part of the drive circuit, and a differential amplifier 21 which forms part of the output logic.

It has been stated above that the storage arrangement is "two-core per bit." More accurately the arrangement is "either one of two cores per bit, depending on the digital significance of the bit." Storage is accomplished by magnetisation in a first or second condition of an area or areas of the thin film overlying the wired ferrite matrix. In the arrangement of FIG. 2 the two shaded areas 22, 23 are the storage areas for one bit. It will be assumed that if the bit to be stored is a "0" then area 22 will be a substantial component of magnetisation thus → while area 23 is magnetised thus ←, but if the bit is a "1" then area 22 will be ← and area 23 will be →.

Magnetisation of the areas 22 and 23 in either direction, i.e. → or ←, is accomplished by passing currents of sufficient amplitude through one or more wires to cause switching of the isotropic material from one condition of saturation to the other. It is the total current, and its direction, that is significant, whether this appears in two wires or one. Thus if the total current required to switch one storage area is $2i$ amps, and such a current is applied in the right direction to wire 17 then both areas 22 and 23 will switch if their existing condition of magnetisation is the same and they are both in the appropriate condition. If they are either or both in the other condition already, switching will not take place, as any such area is merely driven further into its existing condition of saturation. If the total current in wire 17 is only $i$ amps, whilst an additional current of $i$ amp appears in wire 13, then area 22 can be switched, but as only $i$ amps appears under area 23 with no additional current in wire 14, the latter cannot be switched.

Consider now the operation of the arrangement of FIG. 2. Let us assume first that a "0" is to be written into the store. The first requirement is that any existing information in the store be removed, and this is performed by a "clear" operation. To clear the store a pulse of at least $2i$ amps, FIG. 3(17)*a*, is applied over wire 17 in a direction such that both areas 22 and 23 are set to this condition →. This pulse in wire 17 is followed by a "half-write" pulse of amplitude $i$ amps, FIG. 3(17)*b*. This half-write pulse on its own will have no switching effect, but at the same time another half-write pulse is applied to wire 14, FIG. 3(14)*c*, via the switch 20. The two half-write pulses add to give a total current of $2i$ in the magnetic circuit of which area 23 forms a part, and since this total current is of opposite direction to the preceding clearing current area 23 will switch to this condition ←. Wires 13 and 14 are both earthed so that there is no current flowing in wire 13.

A "0" has now been stored and can be read non-destructively by pulsing wire 17 with further half-write pulses. The effect of these is try to switch both areas 22 and 23 to this condition ←. Area 23 however is already in this condition and so little happens. Area 22 is in the other condition and tries to switch but can't because of low power current in wire 17. It does switch partially however, but as soon as the read pulse, FIG. 3(17)*e*, is removed it reverts to this condition →. However, sufficient disturbance of the flux pattern occurs to induce an output pulse in wire 13. Both wires 13 and 14 are connected as inputs to the differential amplifier 21 and so the unbalance between these two wires, due to the read pulse on wire 17, causes an amplifier output the polarity of which indicates that a "0" has been read.

Figure 3:
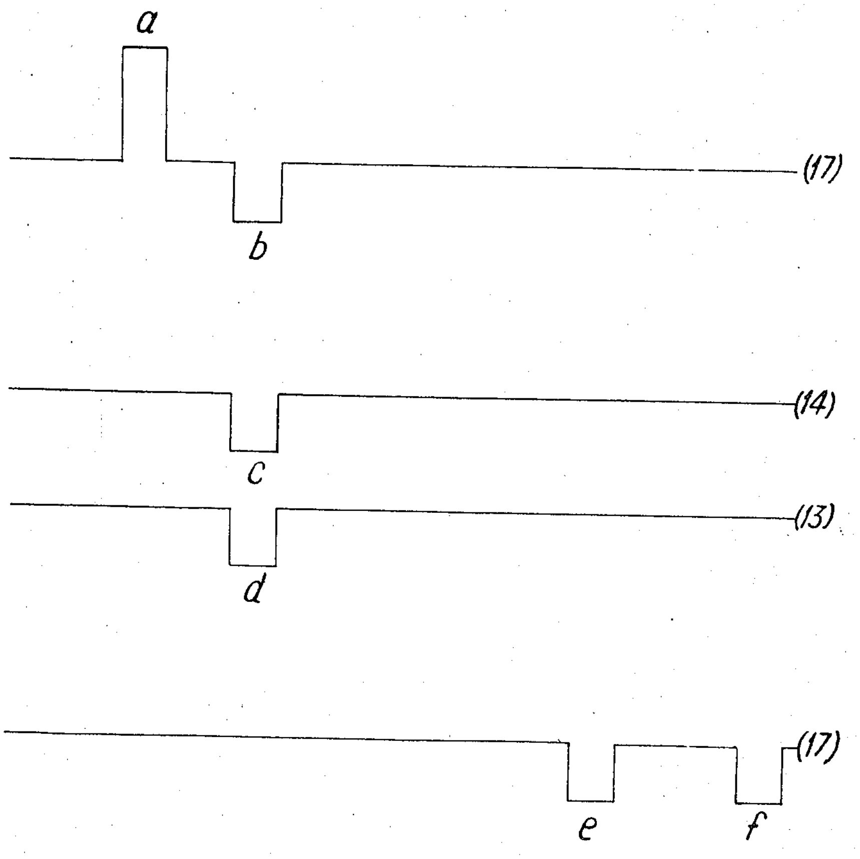

If now a second half-write pulse appears in wire 17, FIG. 3(17)*f*, area 22 will again partially switch and then revert to the condition →, again creating an unbalance in the two wires 13 and 14 and so producing an output from amplifier 21. The reading operation can, it appears, be repeated a considerable number of times without loss of the stored information.

Suppose now that the "0" is to be replaced by a "1." The first operation is pass a clearing pulse, FIG. 3(17)*a*, through the wire 17, followed by the half-write pulse, FIG. 3(17)*b*. Simultaneously with the latter a half-write pulse is applied to wire 13, FIG. 3(13)*d*, and area 22 will now be set to the condition →. Reading pulses in wire 17 will now partially switch area 23 from ← to →, but it will in each case revert to the condition ←. The output of amplifier 21 will be of opposite polarity, indicating a "1" has been stored and read.

Returning now to FIG. 1, it will be noted that the two storage areas for each of two digits have been interleaved. Also the word wire 17 is common to all four storage areas, in fact it will be common to all the storage areas in that row. If the row has $2n$ storage areas it will store $n$ digits.

For any single row, a clearing operation will clear all the digits in a row, but a writing operation will succeed only where both the word and one or more digit wires are energised simultaneously. In practice it is likely that all digit positions would be written into every time, even if all but one were "0" and only one was a "1." This is purely a matter of convenience, since if a digit position were left with two storage areas in the same condition reading would produce no output. It is more convenient to design logic which is always represented with an input of one significance or the other rather than no input.

Another point to be noted is that the read pulses, FIG. 3(17)*e*, *f*, can be identical with the half-write pulses, FIG. 3(17)*b*. They could be of the opposite polarity, but it has been found in practice that a stronger output is obtained when they are of the same polarity. In other words, a stronger output is obtained from an area which has been cleared and not subsequently written into.

A point to note about the disposition of the storage areas is that so long as they are magnetically isolated from one another and have the correct directions of the combined word and digit wires, i.e. induced noise in the sense wire is kept to a minimum, they need not be interleaved as shown nor even on the same row.

What is claimed is:

1. A magnetic storage arrangement in which a bit of digital information can be stored in a non-destructive read-out manner, the arrangement including a planar thin-film of isotropic magnetic material forming a matrix of intersecting row and column slots, a pair of magnetically isolated storage locations separated by at least one intermediate slot and comprising part of the same information bit, each storage location being part of a magnetic circuit completed by magnetic material having a low reluctance and a high electrical resistivity, a first electrical conductor associated with both storage locations and placed in alternate segments of two adjacent row slots, the shift from one segment of one row slot to the succeeding segment of the adjacent row slot being by way of an interconnecting column slot, a second electrical conductor associated with one of the storage locations and sharing a segment of a column slot with the first conductor, a third electrical conductor associated with the other storage location and sharing a segment of another column slot with the first conductor, means for energizing the first conductor along whereby all the storage locations associated therewith are set to a first condition of magnetization, means for energizing the first and second only or the first and third conductors only whereby the combined currents flowing in either pair of conductors so energized is sufficient to switch only either the first or second storage location to a second condition of magnetization, the current flowing in either conductor of an energized pair being insufficient of itself to switch a storage location to the second condition of magnetization, and means for energizing the first conductor whereby the current flowing therein is sufficient to switch partially one of the pair of storage locations associated therewith from one condition toward the other condition, the storage locations returning to and remaining in the original condition at the cessation of any such energization of the first conductor.

2. An arrangement according to claim 1 wherein the thin-film is a nickel-iron film approximately 1$\mu$ thick.

3. An arrangement according to claim 1 in which the low reluctance material is ferrite.

References Cited

UNITED STATES PATENTS

| | | | |
|---|---|---|---|
| 3,413,617 | 11/1968 | Smith | 340—174 |
| 3,417,384 | 12/1968 | Blahut | 340—174 |
| 3,440,622 | 4/1969 | Smith | 340—174 |

STANLEY M. URYNOWICZ, Jr., Primary Examiner